United States Patent [19]

Bastian et al.

[11] Patent Number: 5,081,808
[45] Date of Patent: Jan. 21, 1992

[54] PARTITION WITH ENCLOSURE

[75] Inventors: John M. Bastian; Billy J. Ahola, both of Manitowoc, Wis.

[73] Assignee: Hamilton Industries, Inc., Two Rivers, Wis.

[21] Appl. No.: 634,773

[22] Filed: Dec. 26, 1990

Related U.S. Application Data

[63] Continuation of Ser. No. 294,289, Jan. 6, 1989, abandoned.

[51] Int. Cl.$^5$ .............................. E04B 2/78; E04H 1/00
[52] U.S. Cl. .......................................... 52/220; 52/239; 220/329; 220/334
[58] Field of Search ...................... 220/7, 329, 334; 52/220, 221, 239; 312/223

[56] References Cited

U.S. PATENT DOCUMENTS

| | | | |
|---|---|---|---|
| 1,698,409 | 1/1929 | Lewers et al. | 312/223 |
| 2,077,975 | 4/1937 | Wolff | 312/223 |
| 2,180,151 | 11/1939 | Koeller | 312/223 |
| 2,344,800 | 3/1944 | Butcher | 312/223 |
| 2,350,673 | 6/1944 | Costigan | 220/7 |
| 2,517,914 | 8/1950 | Nowaczek | 312/223 |
| 3,013,852 | 12/1961 | Rockola | 312/223 |
| 3,195,698 | 7/1965 | Codrea | 52/221 |
| 3,289,368 | 12/1966 | Mark | 52/239 |
| 3,541,730 | 11/1970 | Ballantyne | 220/334 |
| 3,828,495 | 8/1974 | Law . | |
| 3,871,153 | 3/1975 | Birum, Jr. | 52/239 |
| 3,883,202 | 5/1975 | Konig . | |
| 3,920,299 | 11/1975 | Propst et al. . | |
| 4,043,626 | 8/1977 | Propst et al. | 52/220 |
| 4,050,752 | 9/1977 | Dykstra . | |
| 4,094,561 | 6/1978 | Wolff et al. . | |
| 4,372,629 | 2/1983 | Propst et al. . | |
| 4,605,988 | 8/1986 | Nienhuis et al. . | |
| 4,646,211 | 2/1987 | Gallant et al. . | |
| 4,734,826 | 3/1988 | Wilson et al. . | |
| 4,862,659 | 9/1989 | Wilson et al. | 52/220 |

FOREIGN PATENT DOCUMENTS 2060022  4/1981  United Kingdom ............... 52/239

*Primary Examiner*—Michael Safavi
*Attorney, Agent, or Firm*—Tilton, Fallon, Lungmus & Chestnut

[57] ABSTRACT

An enclosure for a movable furniture partition system is provided which includes an elongate housing disposed at an edge portion of a panel member. This housing contains electrical conduits and outlets or similar devices and defines a trough with a top opening and moveable side walls. A cover normally closes this opening; and a connecting assembly connects the cover with the trough. This assembly allows a user to open the side walls of the trough. It also allows a user to lift the entire cover from a position normally closing the opening to a raised position above the trough. When the user raises the cover above its closed position, he or she may also displace the cover laterally of the trough.

10 Claims, 2 Drawing Sheets

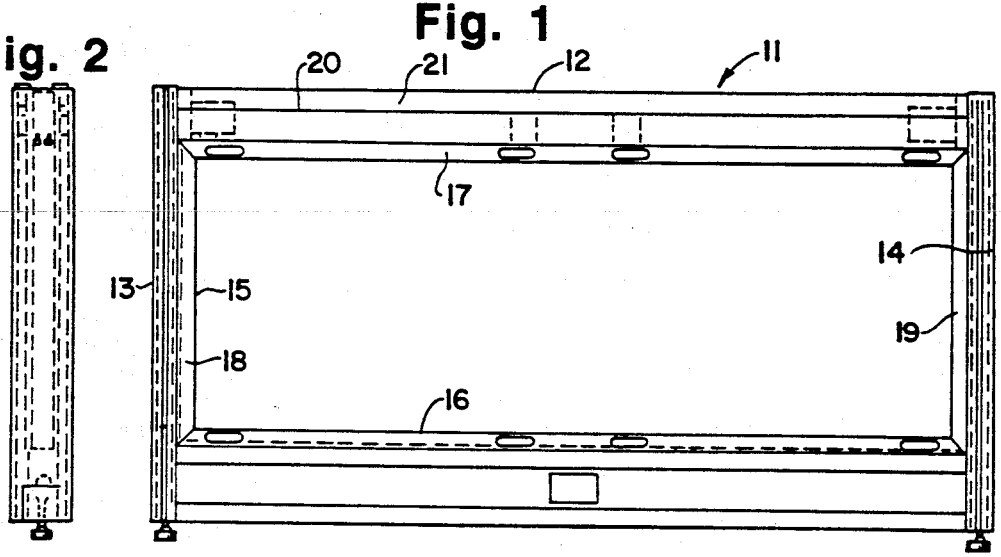
Fig. 1
Fig. 2
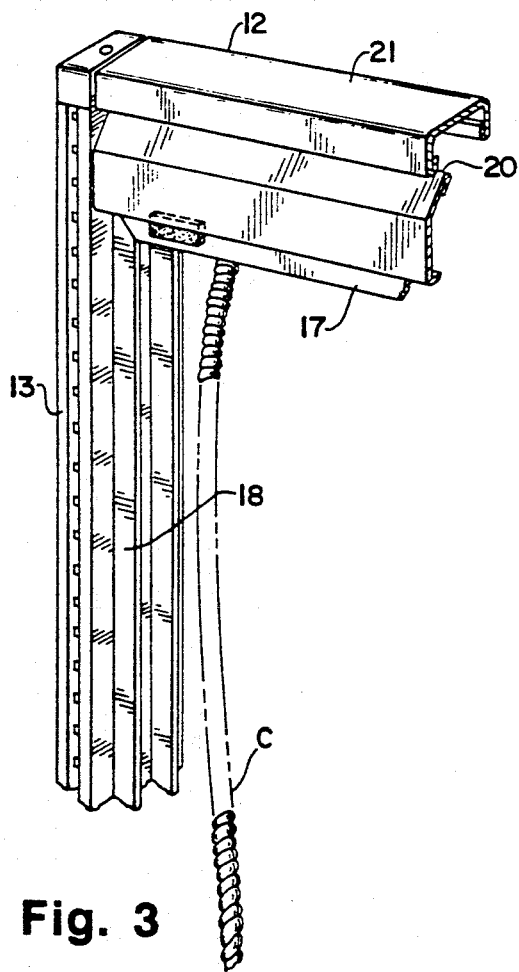
Fig. 3
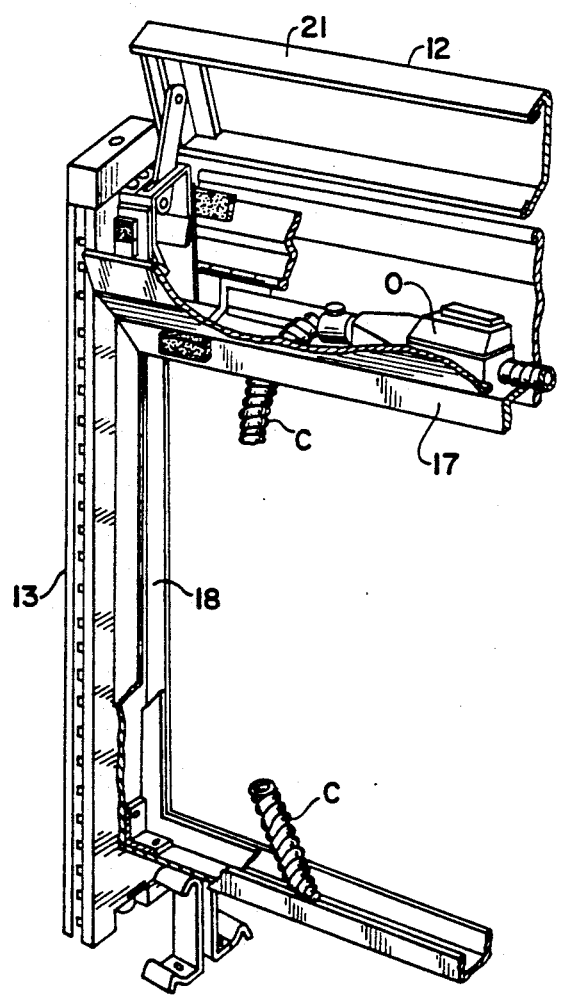
Fig. 4

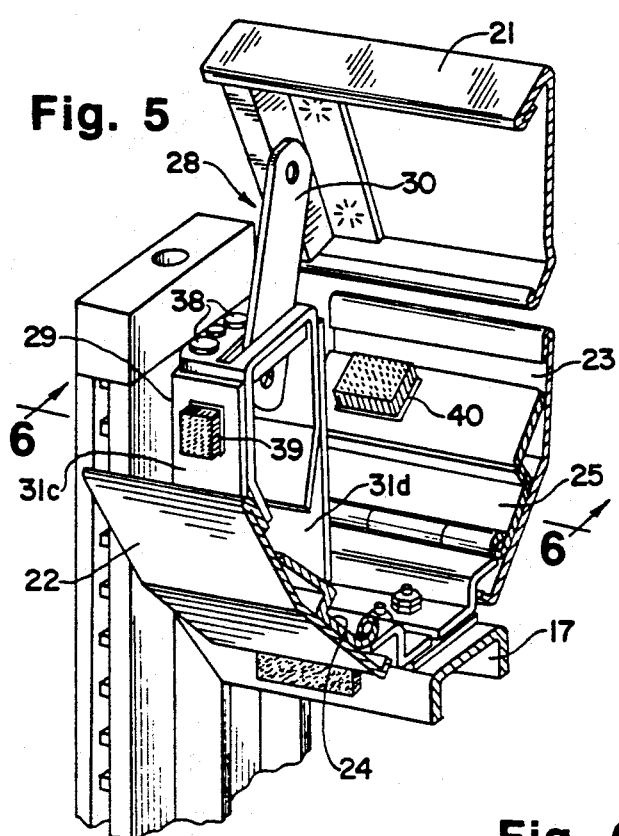
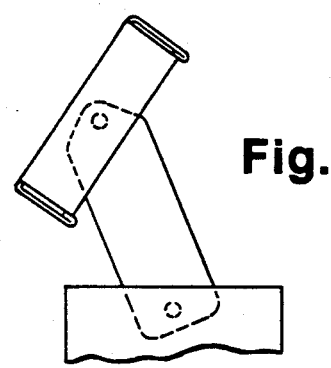
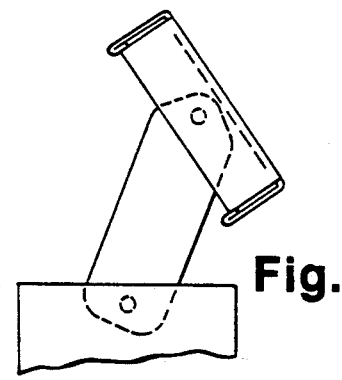
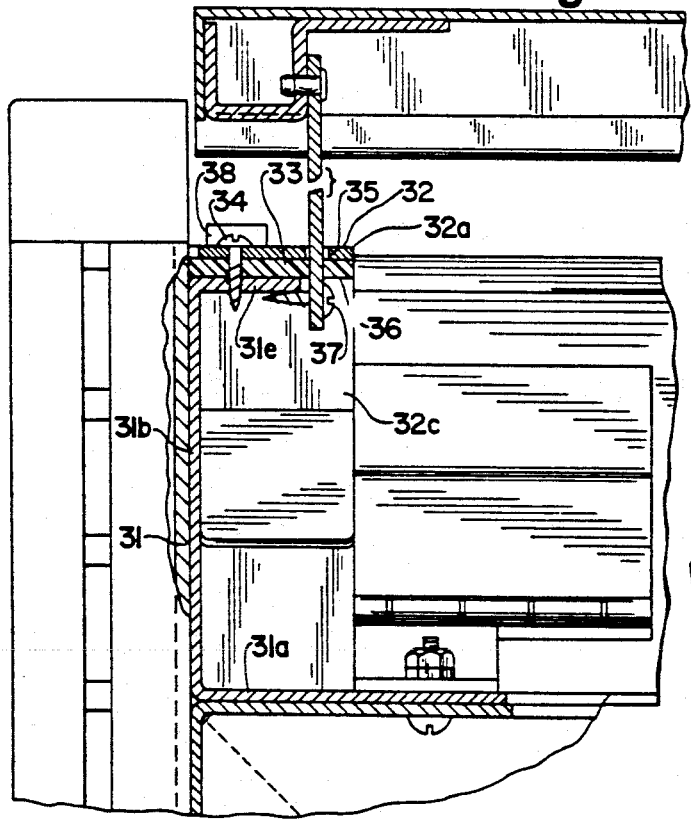
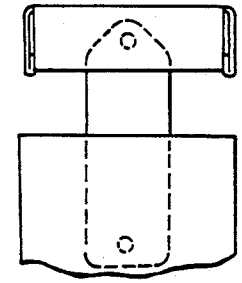
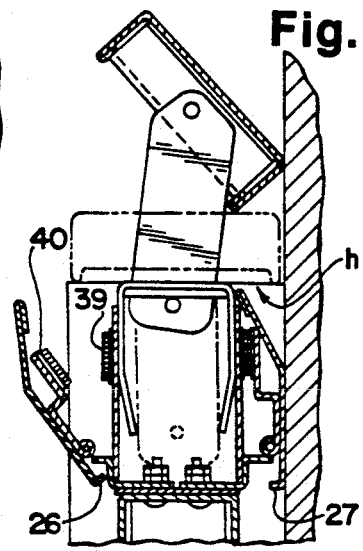

PARTITION WITH ENCLOSURE

This application is a continuation of application Ser. No. 294,289, filed Jan. 6, 1989, now abandoned.

BACKGROUND OF THE INVENTION

1. Field of the Invention

The present invention relates generally to an enclosure for a partition panel of a movable partition system and, more specifically, to an enclosure disposed at an edge portion of a movable partition panel for containing power outlets and similar devices.

2. Description of the Prior Art

The prior art includes a wide variety of partition systems having multiple pre-fabricated panels and related components assembled in various configurations to define work stations, corridors, etc., within large otherwise open office spaces. Typically, the panels used in these systems include (1) a frame made of steel or any other material of high strength and rigidity, and (2) a covering made of fabric. These panels are movable, i.e., they do not form a permanent part of the building structure.

In many system installations, the partition system must include electrical wiring and power outlets. The usually hollow panels may easily receive electrical wiring; but the outlet installations present a number of difficulties. First, they require anchoring to a firm structural support. Second, they include unsightly exposed wires and connectors. Finally, they must lie at a convenient location, within easy reach of the one using the system.

Thus, a partition system construction should contain service outlets, e.g., electrical and telephone outlets, at convenient locations for easy and convenient access. It should also cover these outlets and any unsightly electrical wiring or connectors associated with them. The partition enclosure of the present invention provides such a construction.

SUMMARY OF THE INVENTION

In accordance with one embodiment of this invention, a partition enclosure includes a trough and a cover disposed at an edge portion of a partition panel. The partition panel includes a frame and a frame covering made of fabric or other suitable material. The trough includes a base member which is a cross brace in the frame of the partition panel and which supports electrical outlets and similar devices. It also includes first and second side walls and end walls comprising portions of a first and second post in the frame.

The enclosure's side walls lie along opposite side edges of the base member, hingedly mounted to this member for movement between a raised/closed position and an open/lowered position. These side walls define a top, elongate opening in the trough. When lowered, they allow easier access to the outlets and other devices disposed in the enclosure.

The cover is an elongate member whose cross-section has the shape of an inverted U. It lies over the top of the trough and normally closes the top opening when the trough side walls lie in an upright or closed position. A user may move the cover in the manner described below between a closed position in which the cover conceals the outlets and other devices disposed in the trough and an open position in which it allows easy access to the inside of the trough.

A connecting assembly disposed in the trough connects the trough with the cover. This assembly has at least one anchor member secured to the trough and at least one link member pivotally connected to the cover and disposed in sliding engagement with the anchor member. The link is an elongate plate connected at one end to the cover and having a stop at an opposite end. The stop co-acts with the anchor member to limit the vertical displacement of the link and, consequently, the cover. It also allows the link to pivot at the point that it engages the anchor member.

The anchor member includes a bracket which defines a slot through which the link member extends and slides vertically as well as horizontally. The bracket also defines an opening which communicates with the slot and which receives the link. The portion of the bracket opening proximate the slot has a width greater than the width of the link. Thus, the portion of the link remaining in the bracket opening after a user raises the cover and the stop on the link engages the bracket may move freely. The link may pivot and slide laterally, allowing lateral displacement of the cover. This feature allows a user to place the partition panel and enclosure against a wall and still open the cover.

The bracket has first and second stop portions disposed in the bracket opening. When the user lowers the cover to close the trough, the link moves between the first and second stop portions. These stop portions prevent the link from moving laterally and, accordingly, prevent lateral displacement of the cover.

The enclosure includes at least one stop for each of the first and second side walls for limiting the pivotal displacement of the side walls. It also includes a securing assembly for releasably securing the side walls in a raised position. In the preferred embodiment, this securing assembly includes hook and loop-type strips secured to the side walls and to the connecting assembly bracket.

To open and close the enclosure of the present invention, a user may lift the cover away from the trough and tilt it to either side of the trough. To close the cover, the user may place it over the trough. Alternatively, the user may release the cover and allow it to move to a closing position by itself. The cover's weight allows it to fall; and the link and bracket co-act to guide the cover in place over the trough. There, the cover defines at least one opening with side walls to allow wiring and other conduits to extend into the trough.

BRIEF DESCRIPTION OF THE DRAWINGS

For a more complete understanding of the present invention, one should now refer to the embodiment illustrated in greater detail in the accompanying drawings and described below as an example of the invention. In the drawings:

FIG. 1 is a side elevation view of a frame of a partition panel including the enclosure of the present invention;

FIG. 2 is an end elevation view of the frame shown in FIG. 1;

FIG. 3 is a partial perspective view of one end of the partition frame, showing the partition enclosure of the present invention in a fully closed position at the top edge portion of the partition frame;

FIG. 4 is a partial perspective view of the partition enclosure, showing the enclosure in an open position;

FIG. 5 is an enlarged perspective view of the end of the partition enclosure shown in FIGS. 3 and 4;

FIG. 6 is a sectional view taken along line 6—6 in FIG. 5;

FIGS. 7-9 are side elevation views of the enclosure, showing various displacements of the enclosure cover;

FIG. 10 is a sectional view taken transversely of the enclosure and showing the enclosure disposed against a wall.

DETAILED DESCRIPTION OF THE DRAWINGS

In the illustration given and with reference to FIGS. 1 and 2, the numeral 11 generally designates the frame of a panel used in an office partition system, including the enclosure 12 of the present invention. This frame has a generally rectangular configuration. It includes vertical posts 13 and 14 disposed at opposite ends of the frame and secured to an inner frame 15. The inner frame 15 has a rectangular shape; and it includes horizontal members 16 and 17 which extend between the vertical posts 13 and 14 and vertical members 18 and 19. These vertical frame members 18 and 19 lie parallel to the vertical posts 13 and 14.

The enclosure 12 is structure formed of sheet metal components or, alternatively, components made of any other suitable material of sufficient strength and rigidity. It lies at the top edge portion of the frame 11 and includes a trough 20 and a cover 21. The trough 20 has a base comprising the horizontal member 17 of the inner frame 15 and end walls comprising the top portions of the posts 13 and 14. It also includes a first side wall 22 disposed along one side of the base 17 and a second side wall 23 disposed along the opposite side of the base (See FIG. 5).

A hinge 24 pivotally connects the side wall 22 to the base 17; and a hinge 25 similarly connects the side wall 23 and the base. These hinge members and hinge members at the opposite end of the enclosure (not shown) allow the side walls to move between a raised/closed position (See FIG. 3) to a lowered/open position (See FIG. 5). To limit the outward movement of the side walls, a bottom segment 26 of the side wall 22 engages the hinge 24 (See FIG. 10), and a bottom segment 27 of the side wall 23 engages the hinge 25.

The trough 20 contains electrical outlets O and conduits C which extend into it through openings in the base member 17 (See FIG. 4). Alternatively, the conduits may extend into the trough through the trough's top opening. A user gains access to the inside of the trough through this top opening which the top edges of the side walls 22 and 23 define.

The cover 21 is an elongate member which extends across the entire length of the trough 20. Its cross-sectional shape is generally an inverted U. A user may move the cover 21 between a closed position (See FIG. 3) and an opening position (See FIGS. 4-10). In the closed position, it conceals the outlets and other devices disposed in the trough 20. In the open position, it allows easy access to the inside of the trough.

The cover 21 normally closes the trough's top opening when the side walls 22 and 23 lie in the upright or closed position. However, in the upright position, a bottom portion of each side wall 22 and 23 lies vertically and a top portion extends inwardly of the trough and the side edge of the cover, at a shallow, acute angle from the vertical. (See FIG. 10) This configuration of the side walls provides an opening h between each sidewall and the cover. Conduits or similar devices may extend through this opening when the cover and side walls lie in a closed position. Furthermore, this configuration prevents water or other liquids spilled on the enclosure from flowing into the trough once the user has closed the enclosure.

A connecting assembly 28 disposed in the trough 20 at one end of the trough and a second, identical connecting assembly (not shown) disposed at the opposite end connect the trough 20 and the cover 21. This connecting assembly 28 includes a bracket or anchor member 29 fixedly secured to the base 17 and a link 30 (See FIGS. 5, 6 and 10). The bracket 29 includes a first, box-like member 31 with a base 31a fixedly secured to the base 17 of the trough 20 with nut and bolt assemblies or similar securing devices; a back wall 31b disposed against the post 13; side strips 31c and 31d; and a top portion 31e. This member 31 has two slots formed at the edges of the top portion 31e, across the entire width of the top portion.

The bracket 29 also includes a second, strip member 32 which has an inverted U-like shape with a base portion 32a which lies above the top 31e of the first member 31 and a plastic insert 33 disposed between the top 31e and the base portion 32a. This second member 32 also includes legs 32b and 32c which extend through the two slots at opposite edges of the top 31e. The end portions of these legs 32b and 32c slope inwardly toward each other to reduce the space between them. A screw 34 secures the first member 31, the second member 32, and the plastic insert 33 together.

A slot 35 formed through the base portion 32a of the second member 32 and across the length of the base portion 32a communicates with a corresponding slot 36 in the plastic insert 33 to define an opening in the bracket 29. The slot 36 has a smaller length than the length of the slot 35 and a smaller width than the width of the slot 35. Thus, the plastic insert portion adjacent the slot 36 serves as a bearing and provides a contact surface for the link 30 which moves through the openings 35 and 36, vertically as well as horizontally.

The link 30 extends through the openings 35 and 36 in sliding relation with the plastic insert 33. This link 30 is an elongate plate pivotally connected at one end to the cover 21. It has a stop 37, e.g., a screw, secured to it at the opposite end. The stop 37 co-acts with the bracket 29 to limit the vertical displacement of the link 30 and, accordingly, the cover 21. It also allows the link 30 to pivot at the point the stop engages the bracket 29.

In addition to the stopping action provided by the stop 37, the plastic insert around opening 36 limits the link's motion. FIGS. 7 and 8 show the upper, sideward limits of the link's motion; and FIG. 9 shows its upper, central limit. Thus, the link may move outwardly of the trough 20 and pivot with its outward portion, the portion connected to the cover 21, moving transversely of the elongate trough.

A user may move the cover 21 as shown in FIGS. 7-10, displacing it away from the trough 20 and pivoting it relative to the link 30 and/or the bracket 29. Furthermore, the user may place the enclosure 12 against a wall as shown in FIG. 10 and still open the cover 21. To lower the cover 21 and close the trough 20, the user may hold the cover and lower it to the position shown in FIG. 3 or release the cover and let it fall into the position shown. The cover is "self-closing." The link 30 and the bracket 29 maintain it generally over the trough; its weight allows it to fall; and the link 30 and bracket 29 co-act to guide it to its lowered position.

As the cover moves downward, the link 30 moves between the end portions of the legs 32b and 32c of the second, strip member 32. These end portions act as stops to prevent the link 30 and the cover 21 from moving laterally. When raised, however, the link may pivot relative to the cover 21 and the bracket 29. It may also move laterally in the bracket opening. Therefore, the user may gain access to the trough 20 in the manner described above—by displacing the cover 21 as well as the side walls 22 and 23.

The bracket 29 supports pads 38 on which the cover 21 lies and hook and loop-type strips 39 which co-act with similar strips 40 secured to the side walls 22 and 23. These strips 39 and 40 releasably secure the side walls in an upright, closed position.

Thus, the applicant has provided a partition panel enclosure having a construction which contains service outlets at a convenient location and allows quick and easy access to those outlets. It also covers unsightly electrical wiring and connectors. While the applicant has shown one embodiment, one will understand, of course, that the invention is not limited to this embodiment as those skilled in the art to which the invention pertains may make modifications and other embodiments of the principal of this invention, particularly upon considering the foregoing teachings. The applicant, therefore, by the appended claims intends to cover any modifications and other embodiments and incorporate those features which constitute the essential features of this invention.

What is claimed is:

1. A panel for a furniture partition system, said panel comprising: a frame; an enclosure disposed at an edge portion of the frame, said enclosure including an elongate housing having a base portion and side wall portions defining an elongate opening; cover means normally closing a substantial portion of the opening; and connecting means disposed in the housing and secured to the base portion of the housing for connecting the cover means to the housing, said connecting means allowing the displacement of the entire cover means to a predetermined limit outwardly and laterally of the housing and preventing displacement beyond those limits.

2. The enclosure assembly of claim 1, wherein the side wall portions of the elongate housing are pivotally connected to the base portion.

3. The enclosure assembly of claim 2, wherein the enclosure includes securing means fc securing the side wall portions at predetermined locations.

4. An enclosure assembly for a partition system, said assembly comprising: an elongate housing having a base portion and side wall portions defining an elongate opening, said side wall portions of the housing being pivotally connected to the base portion; cover means normally closing a substantial portion of the opening; and connecting means disposed in the housing and secured to the base portion of the housing for connecting the cover means to the housing, said connecting means allowing the displacement of the entire cover means to a predetermined limit outwardly and laterally of the housing and preventing displacement beyond those limits.

5. The enclosure assembly of claim 4, wherein the enclosure includes securing means for securing the side wall portions at predetermined locations.

6. An enclosure assembly for a partition system, said assembly comprising: an elongate housing having a base portion and side wall portions defining an elongate opening, said side wall portions of the elongate housing being pivotally connected to the base portion; cover means normally closing a substantial portion of the opening; and at least one connecting means disposed in the housing and secured to the base portion of the housing for connecting the cover means to the housing, said connecting means allowing the displacement of the entire cover means to a predetermined limit outwardly and laterally of the housing and preventing displacement beyond those limits, said connecting means including an anchor member fixedly secured to the base portion of the housing, and a link member pivotally mounted to the cover means and disposed in sliding relation with the anchor member, said link member including stop means which co-acts with the anchor member to limit the displacement of the link member and cover means away from the opening of the elongate housing and to pivot the link member against the anchor member.

7. The enclosure assembly of claim 6, wherein the enclosure includes securing means for securing the side wall portions at predetermined locations.

8. The enclosure assembly of claim 6, wherein the cover means and housing define a passageway when the cover means closes the opening, said passageway allowing conduits or other devices to extend into the 9. The enclosure assembly of claim 6, wherein the anchor means includes second stop means for stopping lateral displacement of the link member and the cover means when the cover means closes the elongate opening of the elongate housing.

10. The enclosure assembly of claim 6, wherein the anchor member defines a slot through which the link member extends in telescoping relation with the anchor member.

* * * * *